United States Patent Office 3,219,676
Patented Nov. 23, 1965

3,219,676
POLYMERIC MOLYBDENUM SALTS
Geoffrey Wilkinson, London, England, assignor to Ethyl Corporation, New York, N.Y., a corporation of Virginia
No Drawing. Filed July 15, 1960, Ser. No. 42,996
24 Claims. (Cl. 260—414)

This invention relates to new organometallic compounds and methods for their preparation. More specifically, this invention relates to novel Group VIB metal-carbonyl polymers and their method of preparation.

An object of this invention is to provide new organometallic compounds and methods for their preparation. A more specific object is to provide novel Group VIB metal-containing polymers by reaction of a Group VIB metal-carbonyl with an acid. Further objects will become apparent by a reading of the specification and claims which follow.

My invention involves novel Group VIB metal-acid polymers formed by the reaction of an acid and a Group VIB metal carbonyl compound. The novel polymers of my invention contain the following generic structure as a repeating structural unit:

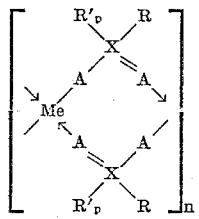

In this formula, X is carbon, sulfur, or a pentavalent Group VA element such as nitrogen, phosphorus, arsenic, antimony or bismuth. A is oxygen or sulfur, preferably oxygen. In the event that X is sulfur, A is oxygen. "$p$" is zero or one, and R' is a monovalent group which can be a lower aryl, a lower alkyl, a lower aralkyl, a lower alkaryl, or hydroxy group. R is a monovalent group which can be a lower aryl, a lower alkyl, a lower aralkyl, a lower alkaryl, hydroxy or a divalent oxo group (O=). As defined above, R and R' can be the same or different with the exception that R can be, in addition, an oxo group.

To further exemplify the meaning of the preceding generic formula, typical examples of my compounds are compounds containing the repeating structural unit

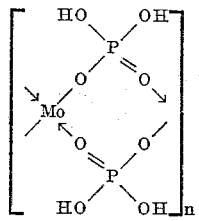

as formed from the reaction of phosphoric acid and molybdenum carbonyl. Similarly, when molybdenum carbonyl is reacted with a phosphonic acid, there is formed a polymer containing a repeating structural unit having the formula

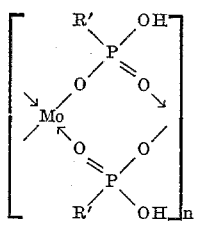

in which R' is as defined above.

A further type of polymer which can be produced from reaction of a pentavalent phosphorus acid and a Group VIB metal carbonyl such as molybdenum carbonyl contains the following repeating structural unit:

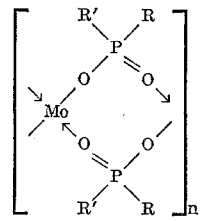

This compound, as formed from reaction of a phosphinic acid and molybdenum carbonyl, has two univalent groups, R and R', bonded to phosphorus. R and R' have the meaning previously set forth. These examples, as shown for pentavalent phosphorus-containing polymers, are by way of illustration only. Similar polymers are formed by reaction of a Group VIB metal carbonyl compound and acids of other pentavalent Group VA elements such as arsenic, antimony and bismuth.

A further type of polymer within the scope of my invention is formed from reaction of sulfuric acid or a sulfonic acid with a Group VIB metal carbonyl compound. These compounds have the formula:

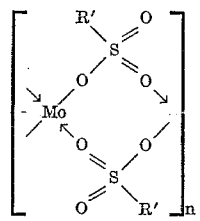

In this formula, R' is as defined above and may be, for example, an alkyl, aryl, alkaryl, aralkyl group or the like. In the case of the compound formed by reaction of molybdenum carbonyl and sulfuric acid, R is a hydroxyl group. A further type of polymer is formed bly reaction between nitric acid and a Group VIB metal carbonyl such as molybdenum carbonyl and has the structure:

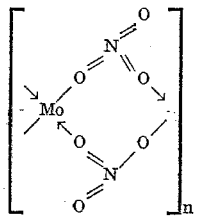

A preferred form of my invention involves polymers formed by reaction of carboxy acids and Group VIB metal carbonyl compounds. These polymers contain the following repeating structural unit

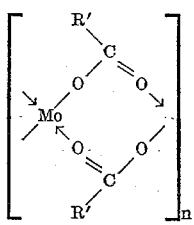

in which R is a univalent group having the meaning previously set forth.

In all of the preceding formulae, "$n$" is a large number indicating the polymeric nature of my compounds.

Preferably, R and R′, as defined previously, contain from zero to about 12 carbon atoms. Examples of groups encompassed by R or R′ which contain no carbon atoms are the hydroxy and oxo groups. Examples of applicable R and R′ groups which preferably contain up to 12 carbon atoms are methyl, ethyl, propyl, butyl, octyl, dodecyl, phenyl, phenylbutyl, 2,6-dimethylphenyl, tolyl, butenyl, benzyl, cyclohexyl, cyclopentadienyl, indenyl, naphthyl and the like. R and R′ may be substituted with various substituent groups such as alkoxy, halogen and the like.

The previous formulae define my polymers in terms of one structural unit which is repeated many times in the structure of the polymer. To illustrate the structure of my polymers in terms of several such repeating units bonded together, there is presented the following formula:

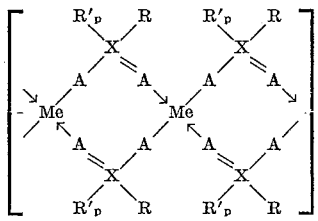

In this formula, each of the terms Me, A, X, R′, $p$, and R have the meaning set forth previously.

The compounds of my invention are prepared by reacting an acid, as illustrated previously, with a Group VIB metal carbonyl. The reaction is conveniently carried out at temperatures between about 75 to about 200° C. and at pressures ranging from one to about 20 atmospheres. Agitation may be employed although this is not essential. The reaction, if desired, may be conducted in the presence of an inert gas such as nitrogen, argon, krypton or neon.

Preferably, an organic solvent is used in the reaction. Typical solvents are aliphatic hydrocarbons such as n-octane, isooctanes, n-hexanes and the like. Also, ether solvents may be used such as dioxane, diethyleneglycol dimethylether, diethyleneglycol dibutylether and tetrahydrofuran. Preferred solvents are the highly polar ethers such as diethyleneglycol dimethylether.

The products may be conveniently separated from the reaction mass by conventional means such as crystallization. The reaction mass, if a solution, may be filtered and cooled to precipitate my products. If the reaction mass is paste-like or in the nature of a slurry, it may be diluted with a neutral solvent prior to cooling to precipitate my products.

Preparation of my novel, polymeric compounds is further illustrated by the following examples in which all parts and percentages are by weight unless otherwise indicated. All of the following examples were carried out under a blanketing atmosphere of an inert gas.

*Example I*

Five grams of molybdenum hexacarbonyl were heated at reflux with about 20 cc. of acetic acid (containing some acetic anhydride to insure dryness). Evolution of carbon monoxide indicated that the reaction was proceeding smoothly, and the acid became brown in color. On prolonged heating, beautiful yellow acicular crystals were deposited. These crystals were filtered from the hot acid and washed with absolute alcohol and ether. On analysis, there was found: Mo, 44.9; C, 22.6; H, 2.9; O, 29.8 percent. Calculated for $(CH_3COO)_2Mo$: Mo, 44.8; C, 22.4; H, 2.8; O, 29.9 percent.

*Example II*

By following exactly the same procedure employed in Example I, molybdenum hexacarbonyl was reacted with propionic acid to give a yellow crystalline product. On analysis, there was found: Mo, 39.5; C, 29.6; H, 4.1; O, 26.2 percent. Calculated for $C_2H_5COO)_2Mo$: Mo, 39.6; C, 29.8; H, 4.2; O, 26.4 percent.

*Example III*

One molecular equivalent of molybdenum hexacarbonyl and two molecular equivalents of octoic acid were heated in a small amount of diethyleneglycol dimethylether at approximately 120° C. until there was no further evolution of carbon monoxide. No solid was precipitated, so the liquid was distilled in high vacuum to leave a brown solid which was slightly soluble in ether. On evaporation of the ether, there was obtained a yellow solid. On analysis of the yellow solid, there was found: C, 49.5; H, 7.9 percent. Calculated for $(C_7H_{15}COO)_2Mo$ C, 50.3; H, 7.9 percent.

*Example IV*

One mole of molybdenum hexacarbonyl was reacted with two moles of p-fluorobenzoic acid in diethyleneglycol dimethylether solvent at about 120° C. Smooth evolution of carbon monoxide occurred, and after several hours yellow needles had deposited. After 20 hours, the reaction mixture was filtered, and the crystals were washed with absolute alcohol and ether to give beautiful yellow crystals. Excess molybdenum hexacarbonyl was sublimed off at 80° C. in vacuo. On analysis, there was found: Mo, 25.7; C, 45.1; H, 2.3; F, 10.3 percent. Calculated for $(FC_6H_4COO)_2Mo$: Mo, 25.6; C, 45.0; H, 2.2; F, 10.2 percent.

*Example V*

Molybdenum hexacarbonyl was reacted with cyclohexylcarboxylic acid. After four hours of heating at about 120° C., yellow crystals began to separate from the reaction mixture. After 18 hours' heating, the reaction mixture was cooled and filtered and washed with hot alcohol to give beautiful yellow crystals. Excess molybdenum hexacarbonyl was sublimed from the product by heating in vacuo. On analysis, there was found: Mo, 27.2; C, 48.1; H, 6.5; O, 18.3 percent. The calculated analysis for $(C_6H_{11}COO)_2Mo$ was: Mo, 27.4; C, 48.0; H, 6.3; O, 18.3 percent.

*Example VI*

One mole of molybdenum hexacarbonyl and two moles of benzenesulfonic acid in diethyleneglycol dimethylether solvent were heated to about 140° C. After about four hours, a pink solid was observed to be precipitating from the brown solution. After eight hours, the solution was cooled and filtered to yield a solid product which was washed with absolute alcohol and ether to give a salmon-pink compound. Excess molybdenum hexacarbonyl was removed from the product by heating in vacuo. On analysis, there was found: Mo, 23.4; C, 36.5; H, 2.8; O, 22.8 percent. Calculated for $(C_6H_5SO_3)_2Mo$ Mo, 23.4; C, 35.1; H, 2.5; O, 23.4 percent.

*Example VII*

One mole of molybdenum hexacarbonyl and two moles of diphenylphosphinic acid were reacted in diethyleneglycol dimethylether solvent at 120 C. to yield a greenish-gray powder which was filtered off and washed with absolute alcohol and ether. On analysis, there was found: Mo, 17.9; C, 54.2; H, 4.0 percent. Calculated for $[(C_6H_5)_2POO]_2Mo$: Mo, 18.1; C, 54.4; H, 3.8 percent.

*Example VIII*

Molybdenum hexacarbonyl was reacted with excess perfluorobutyric acid at reflux to give a black-tary residue which was soluble in most solvents. When the residue was dissolved in toluene and cooled, there was precipitated yellow crystals. On analysis of these crystals, there was found: Mo, 19.2; C, 18.9 percent. $(C_3F_7COO)_2Mo$ requires: Mo, 18.4; C, 18.4 percent.

Example IX

Five parts of molybdenum hexacarbonyl and 4.7 parts of benzoic acid dissolved in freshly-distilled diethyleneglycol dimethylether were heated in a reaction vessel at 160° C. Heating was continued for about nine hours at which time no further evolution of carbon monoxide was noted. Crystals separated out during the reaction, and after cooling volatile matter was removed from the reaction mass by heating at 60° C. at $10^{-3}$ mm. The crystals were washed with warm alcohol and subsequently dried in vacuum. There was obtained 2.72 parts of lemon-yellow needle crystals of molybdenum dibenzoate polymer. Found: C, 49.7; H, 3.1; Mo, 28.0 and O, 19.2 percent. $(C_6H_5COO)_2Mo$ requires: C, 49.7; H, 3.0; Mo, 28.4 and O, 18.9 percent.

By reacting o-toluic acid and molybdenum hexacarbonyl in the manner of Example IX, a 41 percent yield of molybdenum di-o-toluate polymer was obtained having the analysis C, 52.7; H, 4.5; Mo, 26.2 and O, 17.4 percent. The analysis required for $(o—CH_3C_6H_4COO)_2Mo$ is C, 52.5; H, 3.8; Mo, 26.2 and O, 17.5 percent. Likewise, molybdenum di-anisate polymer was prepared in 38 percent yield by reaction of anisic acid and molybdenum hexacarbonyl. The analysis for molybdenum di-anisate was C, 48.1; H, 4.3; Mo, 24.3 and O, 23.7 percent. $(CH_3OC_6H_4COO)_2Mo$ requires: C, 48.2; H, 3.5; Mo, 24.1 and O, 24.1 percent. Both the molybdenum di-o-toluate polymer and molybdenum di-anisate polymer were yellow crystalline solids.

The polymeric compounds of my invention are very stable. As an illustration of their great stability, polymeric molybdenum dibenzoate was placed under a thick pad of glass wool in a small sublimer having an air-cooled probe. After evacuating the sublimer to 0.01 mm., it was slowly heated in a Woods metal bath. At about 350° C., the pale yellow crystals became orange but returned to a yellow color on cooling. At 420° C., yellow crystals started to condense on the probe. The temperature was kept at this value until most of the molybdenum dibenzoate had sublimed. On cooling, the probe was removed and the condensate was analyzed and found to be unchanged polymeric molybdenum benzoate. Its analysis was C, 49.6; H, 3.05; Mo, 28.2 and O, 19.0 percent. It had strong infrared absorptions at 1404 and 1494 $cm.^{-1}$.

The compounds of my invention have great utility as solid lubricants. Their high stability prevents decomposition of the lubricant under the influence of heat and pressure. Also, the metal atoms present in my compounds greatly aid in lubrication.

As an example of the lubricating qualities of my compounds, the molybdenum dibenzoate polymer of Example IX is placed in a Four-Ball Wear machine as described by Larsen and Perry in the "Transactions of the A.S.M.E.," January 1945, pp. 45–50. The four balls are one-half inch in diameter and constructed of SAE 52100 steel. The upper ball is rotated at 79 r.p.m., and the test temperature is 120° C. When so tested, my molybdenum dibenzoate polymer improves lubrication at loads of 5, 10, 15, and 20 kilograms.

Typical polymers within the scope of my invention are chromium di-acetate polymer, tungsten di-nitrate polymer, chormium di-propionate polymer, tungsten di-sulfate polymer, tungsten diarsenate polymer, chromium di-antimonate polymer, tungsten dicyclohexylcarboxylate polymer, chromium di-benzenesulfonate polymer, chromium di-perfluorobutyrate polymer, tungsten di-anisate polymer and the like. As illustrated above for molybdenum di-benzoate polymer, the polymers of my invention are excellent solid lubricants which, due to their high thermal stability, function well in lubricating rubbing surfaces at high temperatures.

Having fully defined the novel compounds of my invention, their novel mode of preparation and their manifold utilities, I desire to be limited only within the lawful scope of the appended claims.

I claim:
1. Polymers containing the repeating structural unit

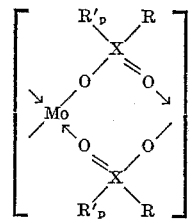

in which X is selected from the group consisting of carbon, sulfur, pentavalent nitrogen, pentavalent phosphorus, and pentavalent arsenic, R is a radical selected from the class consisting of the divalent oxygen radical and monovalent radicals selected from the class consisting of the hydroxyl radical and organic groups having 1 to 12 carbon atoms selected from the class consisting of aryl, alkyl, aralkyl and alkaryl radicals, and R' is a monovalent radical selected from the class consisting of the hydroxyl radical and organic radicals having 1 to 12 carbon atoms selected from the class consisting of aryl, alkyl, aralkyl, and alkaryl radicals, and $p$ is an integer having a value of zero to one such that when the maximum covalency of X is satisfied by the oxygen atoms and the R radical bonded thereto, $p$ is equal to zero.

2. Process for the preparation of the polymers of claim 1, said process comprising reacting molybdenum hexacarbonyl with an acid selected from the class consisting of nitric acid, phosphoric acid, arsonic acid, and organic acids selected from the class consisting of phosphonic acids, phosphinic acids, arsonic acids, and carboxylic acids wherein the organic radicals have 1 to 12 carbon atoms and are selected from the class consisting of aryl, alkyl, aralkyl, and alkaryl radicals, said process being carried out in an inert organic solvent.

3. A polymeric molybdenum-containing compound containing the repeating structural unit

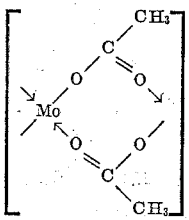

4. A polymeric molybdenum-containing compound containing the repeating structural unit

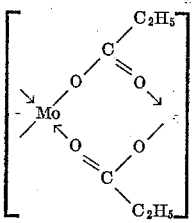

5. A polymeric molybdenum-containing compound containing the repeating structural unit

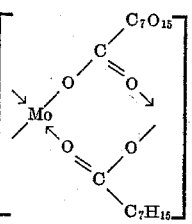

6. A polymeric molybdenum-containing compound containing the repeating structural unit

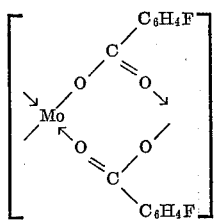

7. A polymeric molybdenum-containing compound containing the repeating structural unit

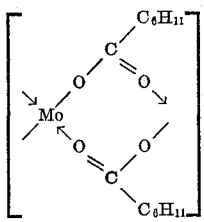

8. A polymeric molybdenum-containing compound containing the repeating structural unit

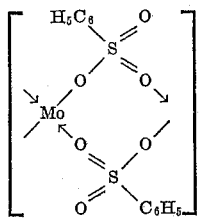

9. A polymeric molybdenum-containing compound containing the repeating structural unit

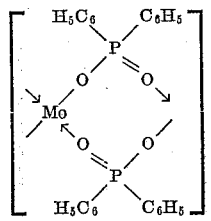

10. A polymeric molybdenum-containing compound containing the repeating structural unit

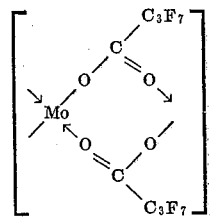

11. A polymeric molybdenum-containing compound containing the repeating structural unit

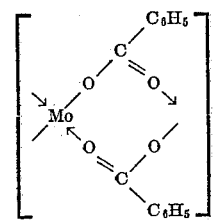

12. A polymeric molybdenum-containing compound containing the repeating structural unit

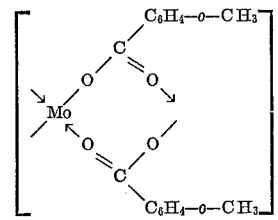

13. A polymeric molybdenum-containing compound containing the repeating structural unit

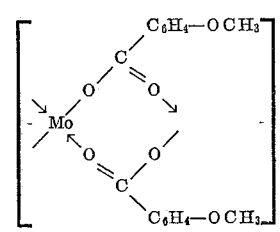

14. Process for the preparation of a polymeric molybdenum-containing compound containing the repeating structural unit

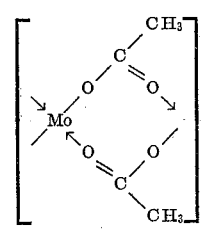

said process comprising reacting a molybdenum hexacarbonyl with acetic acid in an inert organic solvent.

15. Process for the preparation of a polymeric molybdenum-containing compound containing the repeating structural unit

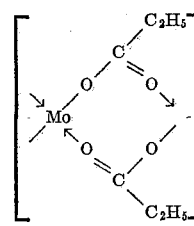

said process comprising reacting a molybdenum hexacarbonyl with propionic acid in an inert organic solvent.

16. Process for the prepartion of a polymeric molybdenum-containing compound containing the repeating structural unit

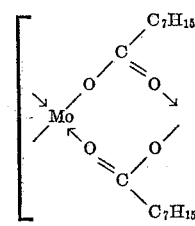

said process comprising reacting a molybdenum hexacarbonyl with octoic acid in an inert organic solvent.

17. Process for the preparation of a polymeric molybdenum-containing compound containing the repeating structural unit

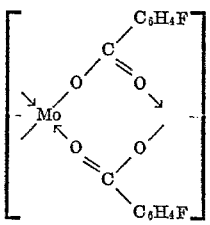

said process comprising reacting a molybdenum hexacarbonyl with p-fluorobenzoic acid in an inert organic solvent.

18. Process for the preparation of a polymeric molybdenum-containing compound containing the repeating structural unit

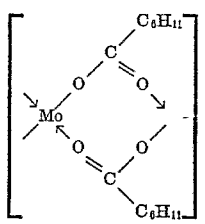

said process comprising reacting a molybdenum hexacarbonyl with cyclohexyl carboxylic acid in an inert organic solvent.

19. Process for the preparation of a polymeric molybdenum-containing compound containing the repeating structural unit

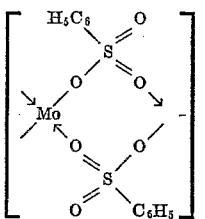

said process comprising reacting a molybdenum hexacarbonyl with benzene sulfonic acid in an inert organic solvent.

20. Process for the preparation of a polymeric molybdenum-containing compound containing the repeating structural unit

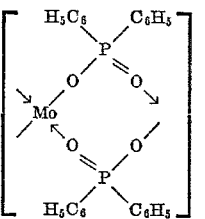

said process comprising reacting a molybdenum hexacarbonyl with diphenylphosphenic acid in an inert organic solvent.

21. Process for the preparation of a polymeric molybdenum-containing compound containing the repeating structural unit

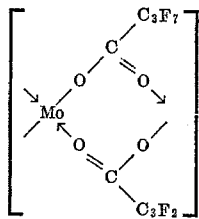

said process comprising reacting a molybdenum hexacarbonyl with perfluorobutyric acid in an inert organic solvent.

22. Process for the preparation of a polymeric molybdenum-containing compound containing the repeating structural unit

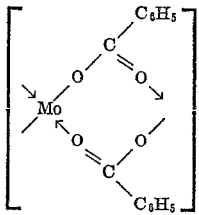

said process comprising reacting a molybdenum hexacarbonyl with benzoic acid in an inert organic solvent.

23. Process for the preparation of a polymeric molybdenum-containing compound containing the repeating structural unit

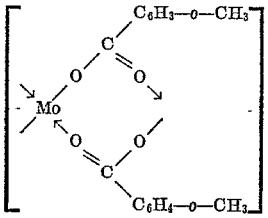

said process comprising reacting a molybdenum hexacarbonyl with o-toluic acid in an inert organic solvent.

24. Process for the preparation of a polymeric molybdenum-containing compound containing the repeating structural unit

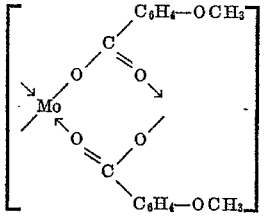

said process comprising reacting a molybdenum hexacarbonyl with anisic acid in an inert organic solvent.

References Cited by the Examiner

UNITED STATES PATENTS

| | | | |
|---|---|---|---|
| 2,615,860 | 10/1952 | Burgess | 260—429 |
| 3,014,939 | 12/1961 | Kluiber | 260—429 |

TOBIAS E. LEVOW, *Primary Examiner.*